United States Patent [19]

Bentley et al.

[11] 4,294,735

[45] Oct. 13, 1981

[54] COATING COMPOSITIONS

[75] Inventors: John Bentley; Morice Thompson, both of Maidenhead, England

[73] Assignee: Imperial Chemical Industries Limited, London, England

[21] Appl. No.: 114,316

[22] Filed: Jan. 22, 1980

Related U.S. Application Data

[63] Continuation-in-part of Ser. No. 896,597, Apr. 14, 1978, abandoned.

[30] Foreign Application Priority Data

Apr. 25, 1977 [GB] United Kingdom ............... 17124/77

[51] Int. Cl.$^3$ .................... C09D 3/48; C09D 3/66; C09D 5/02
[52] U.S. Cl. .................... 260/22 CB; 260/23 P; 260/31.2 R; 260/31.8 R; 260/33.6 UA
[58] Field of Search ............. 260/22 CB, 22 M, 23 P, 260/33.6 UA, 31.2 R, 31.8 R

[56] References Cited

U.S. PATENT DOCUMENTS

| | | | |
|---|---|---|---|
| 3,264,234 | 8/1966 | Osmond | 260/22 CB |
| 3,382,297 | 5/1968 | Thompson | 250/33.2 R |
| 3,433,753 | 3/1969 | Farkas et al. | 260/22 CB |
| 3,514,500 | 5/1970 | Osmond et al. | 260/33.6 R |
| 3,607,821 | 9/1971 | Clarke et al. | 260/33.6 R |
| 3,652,472 | 3/1972 | Clarke et al. | 260/22 CB |
| 3,661,835 | 5/1972 | Baker et al. | 260/29.1 R |
| 3,688,114 | 8/1972 | Thompson et al. | 260/33.6 UA |
| 3,717,605 | 2/1973 | Osmond et al. | 260/33.6 R |
| 3,812,075 | 5/1974 | Burdett et al. | 260/33.6 R |
| 3,857,810 | 12/1974 | Baker et al. | 260/33.6 R |
| 3,891,572 | 6/1975 | Moody et al. | 424/33 |
| 3,925,295 | 12/1975 | Osborn et al. | 260/33.6 R |
| 3,935,155 | 1/1976 | Osmond et al. | 260/33.6 R |
| 3,948,846 | 4/1976 | Waters | 260/33.6 UA |
| 3,981,839 | 9/1976 | Asher et al. | 260/33.6 R |
| 3,985,700 | 10/1976 | Nicks et al. | 260/33.6 R |
| 4,025,471 | 5/1977 | Takahashi | 260/22 CB |
| 4,059,557 | 11/1977 | Bentley et al. | 260/33.6 UA |

FOREIGN PATENT DOCUMENTS

| | | | |
|---|---|---|---|
| 992637 | 5/1965 | United Kingdom. | |
| 1052241 | 12/1966 | United Kingdom | 260/22 CB |
| 1156012 | 6/1969 | United Kingdom | 260/22 CB |
| 1242054 | 8/1971 | United Kingdom. | |
| 1319781 | 6/1973 | United Kingdom | 60/22 CB |

*Primary Examiner*—Ronald W. Griffin
*Attorney, Agent, or Firm*—Cushman, Darby & Cushman

[57] ABSTRACT

Coating compositions are described in which the film-forming material consists of (a) 30–85% by volume of disperse particles of size 0.01–20 microns, of which not less than 50% by volume are non-crosslinked polyester microparticles, and (b) 70–15% by volume of a liquid continuous phase of viscosity 0.1–20 poise which is curable to a film-forming polymer by means of an autoxidative (i.e. air-drying) mechanism, the particles (a) being stably dispersed in the liquid (b) in a deflocculated state by means of an amphipathic steric stabilizing agent; the liquid continuous phase is composed of an autoxidizable derivative, such as a drying-oil fatty acid ester of a polyol in conjunction with a coreactive liquid such as an acrylic or methacrylic ester of a higher alcohol or a polyol.

12 Claims, No Drawings

COATING COMPOSITIONS

This is a continuation-in-part of prior U.S. application Ser. No. 896,597, filed Apr. 14, 1978, now abandoned.

This invention relates to autoxidisable coating compositions having a high content of film-forming material, more particularly to such compositions in which a substantial proportion of the total film-forming material consists of polymer microparticles and the remaining proportion of that material consists predominantly of liquid compounds which are susceptible to an autoxidative curing (i.e. air-drying) process.

In the coatings art, there has in recent years been a marked interest in increasing as much as possible the proportion present in coating compositions of actual film-forming material, and hence of reducing the proportion of inert liquid diluents which are required to evaporate during the process of forming a film and causing it to dry or cure. One factor which has promoted this interest is the realisation that such use of inert diluents is inherently wasteful, but perhaps the most significant factor is the need to reduce atmospheric pollution caused by their evaporation. The achievement of higher contents of film-forming material is, however, subject to difficulties, of which the most immediate is the penalty of high viscosity which is incurred when attempts are made to dissolve a high proportion of film-forming polymer in a small proportion of liquid diluent. This penalty may be avoided or minimised by using film-forming materials of lower molecular weight which are capable of undergoing further polymerisation after application to the substrate, but other difficulties then arise due to the fact that these materials are required to have a high functionality in order to achieve an acceptable rate of cure of the film. In autoxidative curing systems particularly, such high functionality means that the degree of curing can continue to increase over an extended period of time and eventually become excessive, leading to embrittlement and other inferior mechanical properties in the film.

Coating compositions have already been proposed in which part of the film-forming polymer is present as insoluble polymer microparticles; films or coatings prepared from such compositions are of a composite character, having a polymer matrix or continuous phase derived from polymer which was originally present in solution, and a disperse phase derived from the microparticles. The microparticles are insoluble in the continuous phase liquid either because they consist of a polymer which is inherently insoluble therein or because, although they consist of a polymer which is inherently soluble in the liquid, the polymer is crosslinked. Some of these proposals have had as their principal objective the useful modification of the mechanical properties, e.g. of impact strength, of the matrix polymer by the presence of the microparticles.

More specifically, autoxidative curing coating compositions which contain insoluble, non-crosslinked polymer microparticles have been proposed in British Pat. No. 992,637. Although this document does not explicitly discuss the mechanism by which the microparticles operate, it is stated that the coating compositions possess properties superior to those of compositions not containing the microparticles but otherwise analogous. The invention disclosed in the said patent consists essentially of producing, according to previously known methods, a sterically stabilised dispersion of particles, of a size not greater than 10 microns, of a linear addition polymer is a volatile organic liquid, adding thereto a film-forming liquid or low-melting solid substance of lower volatility than the organic liquid, and thereafter evaporating off the organic liquid so as to leave a stable dispersion of the addition polymer particles in the said film-forming substance. Included amongst the film-forming substances which are disclosed in the said British patent are drying oils, semi-drying oils and a drying oil-modified alkyd resin. It is apparent that, by utilising the procedure described, it is possible to prepare autoxidative curing compositions which have a high content of film-forming material. However, notwithstanding a statement in the British specification to the contrary, these compositions suffer from the drawback of high viscosity, which detracts considerably from their value for the production of coatings; also, their curing characteristics leave a good deal to be desired.

We have now devised coating compositions of the autoxidative curing type, containing polymer microparticles, which are capable of having very high film-forming solids contents and yet are not prone to the disadvantages referred to above.

According to the present invention there is provided a coating composition in which the film-forming material consists of:

(a) from 30% to 85% by volume of a disperse phase consisting of particles having a size or size distribution in the range 0.01 to 20 microns, not less than 50% by volume of those particles consisting of noncrosslinked polyester microparticles, and the disperse phase being in a state of stable dispersion as hereinafter defined in (b) from 70% to 15% by volume of a liquid continuous phase in which said polyester is insoluble, the continuous phase having a viscosity of from 0.1 to 20 poise at room temperature, being capable of curing to a film-forming polymer by an autoxidative polymerisation reaction and consisting of a homogeneous mixture of:

(i) an autoxidisable derivative of a polyhydric alcohol such that in each molecule of the derivative there are present from 4 to 12 autoxidisable groupings bound by ester or ether linkages to a polyhydric alcohol residue, the said derivative having a boiling point in excess of 150° C., and (ii) a liquid compound of viscosity less than 2 poise at room temperature which contains in the molecule at least one unsaturated grouping coreactive with the autoxidisable groupings in (i) but which is not itself capable of undergoing autoxidative polymerisation, the said compound having a boiling point in excess of 150° C.;

the total volume of (a) and (b) being 100% and the autoxidisable groupings constituting at least 30% of the total number of autoxidisable groupings and coreactive groupings in the continuous phase.

By "non-crosslinked polyester" is meant herein a polymer of this class which is obtained by the condensation of substances containing suitable functional groups, either with or without the elimination of a low molecular weight by-product, the functionalities of the said substances with respect to the condensation reaction and their relative proportions being selected in accordance with known principles in such a way that the resulting polymer is molecularly soluble in an appropriate liquid solvent (as contrasted with a crosslinked polymer, which is insoluble in all liquids although it may be swollen by certain of them).

When we refer to "autoxidisable groupings", we mean groupings which, through initial attack by atmospheric oxygen, can bring about the subsequent dimerisation and/or polymerisation of the substance containing that grouping. It may at the same time bring about the dimerisation and/or polymerisation of other substances present containing groupings which, although not autoxidisable in the sense just defined, are "coreactive" in the sense that they can take part in the polymerisation process initiated by the other species. This is the process commonly referred to as "air-drying" and, as is well recognised, is dependent upon the presence in the constituent in question of certain types of unsaturated grouping; specific examples of such groupings are mentioned in the description which follows.

The polyester microparticles present in the disperse phase of the compositions of the invention are, as will be apparent from the foregoing definition, particles of such polymers which are of colloidal dimensions and are insoluble in the continuous phase liquid. The particles are arranged to be insoluble in that liquid by appropriate choice of the chemical composition of the polymer (i.e. so that its polarity is markedly different from that of the liquid).

The polyester microparticles may if desired be plasticised with an inert plasticiser, which may be either soluble or insoluble in the continuous phase liquid.

The state of stable dispersion in the continuous phase liquid, in which the polyester microparticles are present, is a substantially de-flocculated, sterically stabilised state achieved by means of an amphipathic dispersing agent, the molecule of which contains a polymeric component which is solvatable by the continuous phase liquid and another component which is relatively non-solvated thereby and is capable of associating with the surface of the microparticles, or preferably of reacting with the polymer contained in those particles. By "solvatable" is here meant that, if the polymeric component of the dispersing agent were unattached to the remainder of the agent molecule, it would be soluble in the continuous phase liquid wholly as individual molecules. The dispersing agent will itself also be soluble in the continuous phase liquid, but the resulting solution will usually contain both individual molecules and micellar aggregates of molecules, in equilibrium with each other. The type of dispersing agent preferred for use in the invention is a block or graft copolymer containing two types of polymeric component; one type consists, as stated above, of polymer chains which are solvatable by the continuous phase liquid and the other type consists of polymer chains which are of different polarity from the first type, are accordingly not solvatable by that liquid and are capable of becoming anchored to the polymer microparticles. A particularly useful form of such a dispersing agent is a graft copolymer comprising a polymer backbone, which is the non-solvatable or anchor component, and a plurality of solvatable polymer chains pendant from the backbone.

In one embodiment of the invention, the amphipathic dispersing agent contains in the molecule autoxidisable groupings as hereinbefore defined. Usually such autoxidisable groupings will be present in the solvatable component of the dispersing agent molecule, but they may if desired be present in some other part of the molecule. Through the agency of these groupings, the polymeric microparticles are caused, in a cured film prepared from the composition of the invention, to become bonded to the matrix constituted by the polymer formed on curing of the liquid continuous phase.

Where the amphipathic dispersing agent does not contain autoxidisable groups as such, it is nevertheless preferred that the dispersing agent should contain groupings which are at least coreactive as hereinbefore defined, that is to say which are capable of taking part in the autoxidative curing process undergone by the liquid continuous phase. The location of such groupings in the dispersing agent molecule, and the role of such groupings in ensuring bonding of the microparticles to the matrix polymer, will be the same as that discussed above in the case of autoxidisable groupings.

The nature of both the autoxidisable groupings and the coreactive groupings, which may be present in the amphipathic dispersing agent, is discussed in detail below.

In addition, the component of the amphipathic dispersing agent which is capable of associating with the surface of the polyester microparticles will preferably contain groupings which are capable of becoming chemically linked to the polymer of which the microparticles consist. For example, it may be arranged that the associating component of the dispersing agent contains a glycidyl group and that the polymer in question contains a carboxyl group, these groups then being caused to coreact. Another method of bringing about such a linkage is described below in connection with methods for producing the microparticles.

The purpose of the preferred features of the invention described in the immediately preceding paragraphs is to ensure that a strong bond is developed between the polymer microparticles and the matrix polymer formed on curing of the film-forming constitutent of the continuous phase liquid. Since each microparticle is essentially enclosed by a sheath or barrier composed of the amphipathic dispersing agent, whereby the steric stability of the microparticles is achieved, it is highly desirable that this barrier should become firmly bonded both to the microparticles and to the matrix polymer in order to ensure optimum mechanical properties and durability of the ultimate fully cured film.

As a further alternative, bonding of the microparticles may be effected through the inclusion in the microparticle polymer itself of coreactive groupings of the type present in component (ii) of the liquid continuous phase, as described in more detail below.

The stable dispersion of the polyester microparticles in the continuous phase liquid may be prepared by dispersing preformed polymer particles of suitable size in that liquid in the presence of the amphipathic dispersing agent. However, the dispersion is more desirably and conveniently obtained by generating the microparticles in situ through a process of dispersion polymerisation of suitable reactants in the presence of the same dispersing agent, using as diluent a volatile, inert organic liquid in which the microparticles produced are insoluble. The microparticles can if desired subsequently be separated from the resulting dispersion, e.g. by spray drying, and then incorporated with the continuous phase liquid (in which they will become stably dispersed) in order to produce the composition as hereinbefore defined. Alternatively, and preferably, the liquid film-forming material may be added to the dispersion when polymerisation of the reactants is complete and the volatile diluent then removed by distillation, leaving a stable dispersion of the microparticles in that material. However, as discussed below, the presence in the compositions of a minor proportion of an inert liquid diluent is in some cases acceptable and the dispersion of microparticles can under these circumstances be blended directly with the other constituent or constituents of the liquid continuous phase.

Suitable processes of dispersion polymerisation are well known and extensively described in the literature. For a general description of the principles involved, reference may be made to "Dispersion Polymerisation in Organic Media", ed. K.E.J. Barrett (John Wiley & Sons, 1975). The production of dispersions specifically of condensation polymers such as polyesters is described, for example, in British Pat. Specifications Nos. 1,373,531; 1,403,794 and 1,419,199, and in U.S. Application Ser. No. 795,307. The procedure basically consists of polymerising the starting materials, from which the polymer is derived, in an inert liquid in which the polymer is insoluble, in the presence dissolved in that liquid of the amphipathic dispersing agent or of a polymeric precursor which, by copolymerisation or grafting with a portion of the polymerising reactants, can give rise in situ to such a dispersing agent. Because of the usually polar nature of the starting materials from which such condensation polymers are derived, as well as of the polymers themselves, the monomers in question are usually insoluble in the inert liquid in which the polymerisation is to be carried out. Accordingly the first step in the dispersion polymerisation of the reactants is to bring them into a state of colloidal dispersion in the inert liquid, either as liquid or as solid particles. In the second step, polymerisation of the reactants takes place mainly within those same particles. An amphipathic dispersing agent is required in each stage, firstly in order to stabilise the particles of reactant and secondly in order to stabilise the particles of polymer formed but in suitable cases a single dispersing agent can be found which will perform both these functions.

Suitable starting materials for preparing polyester microparticles are those which are well known for use in making such polymers by melt or solution polymerisation techniques. They are, for example, polyhydric alcohols such as ethylene glycol, propylene glycol, butylene glycol, 1:6-hexylene glycol, neopentyl glycol, diethylene glycol, triethylene glycol, tetraethylene glycol, glycerol, trimethylolpropane, trimethylolethane, pentaerythritol, dipentaerythritol, tripentaerythritol, hexane triol, oligomers of styrene and allyl alcohol (for example, that sold by Monsanto Chemical Company under the designation RJ 100) and the condensation products of trimethylolpropane with ethylene oxide or propylene oxide (such as the products known commercially as "Niax" triols), in conjunction with polycarboxylic acids such as succinic acid or anhydride, adipic acid, azelaic acid, sebacic acid, maleic acid or anhydride, fumaric acid, muconic acid, itaconic acid, phthalic acid or anhydride, isophthalic acid, terephthalic acid, trimellitic anhydride, pyromellitic acid or anhydride, truxinic acid or truxillic acid.

The microparticle polymer will be formulated in accordance with the principles which are well understood in the art, whereby some degree of branching may be introduced into the polymer whilst avoiding the incidence of crosslinking which would cause gelation. In determining the admissible extent of branching, both the functionalities and the relative proportions of reactants of functionality greater than two need to be taken into account. A quantitative treatment of this subject is given by Stockmayer in Journal of Polymer Science, 1952, 9, 69.

The non-crosslinked polyesters are in general soluble on a molecular scale in strong, i.e. relatively polar, solvents, such as esters and ketones, because of the polar character of the polymers themselves; for the same reason, they are insoluble in aliphatic hydrocarbon diluents, and in particular they are required to be insoluble in the continuous phase liquid of the composition of the invention.

A feature of certain of the dispersion polymerisation processes referred to above, in particular those described in British Pat. Specifications Nos. 1,373,531; 1,403,794 and 1,419,199, is that the amphipathic dispersing agent used contains a grouping which is capable of taking part in the polymerisation of the reactants from which the condensation polymer of the microparticles is derived; the dispersing agent may, for example, contain an epoxide group which can coreact with the hydroxyl, carboxyl or amino groups present in the reactants employed. Use of this feature makes it possible to ensure the firm anchoring or bonding of the dispersing agent to the surface of the microparticles, which was referred to earlier.

Some examples of suitable amphipathic dispersing agents in accordance with the foregoing description are the following:

(i) a graft copolymer obtained by reacting poly(-ricinoleic acid) with an 85:15 copolymer of methyl methacrylate and glycidyl methacrylate of molecular weight 10,000–20,000; this graft copolymer thus has an acrylic backbone which is the anchor component and, pendant therefrom, a plurality of solvatable side-chains which also possess autoxidisable functionality.

(ii) a graft copolymer obtained by reacting (a) a low molecular weight, carboxyl group-terminated condensate of linseed oil fatty acids and 12-hydroxystearic acid with (b) a 90:10 copolymer of ethyl acrylate and glycidyl methacrylate; the structural functionality of this copolymer is similar to that of (i).

(iii) the reaction product of a carboxyl group-terminated polybutadiene of molecular weight about 4000 and an 80:20 copolymer of methyl methacrylate and glycidyl methacrylate.

(iv) a graft copolymer similar to (ii) but made using a deficiency of the fatty acid condensate so as to leave some unreacted glycidyl groups in the copolymer backbone which are capable of reacting with the polymer in the microparticle by a condensation reaction.

(v) a graft copolymer as in (iv) where the excess of glycidyl groups are subsequently reacted with acrylic acid or methacrylic acid so as to introduce groups pendant from the backbone which are capable of copolymerising with vinyl monomers from which the microparticles are derived.

(vi) the graft copolymer produced in situ during the production of condensation polymer microparticles from the reaction of the glycidyl ester of poly(-ricinoleic acid) as precursor with the polymerising reactants.

(vii) the product of (a) reacting 4-hydroxybutylvinyldioxolane with poly-(12-hydroxystearic acid) and (b) subsequently reacting the hydroxy polymer obtained with a copolymer of methyl methacrylate and methacrylic anhydride; the copolymer produced has an acrylic anchor backbone and pendant solvatable chains which are terminated by vinyl dioxolane groups that are capable of undergoing both autoxidative and normal vinyl polymerisation reactions.

A cured film prepared from a coating composition according to the invention will contain a high proportion of the polyester microparticles and accordingly the properties of those particles themselves will contribute significantly to the mechanical properties of the film. The microparticles may be rubbery or glassy, that is to say their glass transition temperature (Tg) may be below or above ambient temperature respectively, and this will be reflected in the properties of the final film. Where the polymer is rubbery, this inclusion of rubbery particles may contribute to, e.g. the impact resistance of the cured film.

It has previously been stated that the microparticles should have a size or size distribution in the range 0.02–20 microns. In order to obtain high solids compositions, it is useful if the particles are not of uniform particle size distribution; this ensures fluid compositions at higher disperse phase packing fractions. The distribution may be bimodal or polymodal.

Although the disperse phase of the compositions of the invention may consist solely of the non-crosslinked polyester microparticles, in which case those particles themselves will constitute from 30% to 85% by volume of the total composition, as previously defined, there may (and in most cases will) also be present in the disperse phase particles of pigments, fillers or extenders such as are commonly used in coating compositions. These other particles may be present in the disperse phase in any amount up to a maximum which is equal in volume to the polymer microparticles present, but the total amount of all these particles will always lie in the range 30% to 85% of the total volume of the composition.

Such particles of pigment or like materials will preferably be of a size or size distribution which is conventional in the coatings art, for example from 0.1 to 5 microns; they may be either similar or dissimilar in size to the polymer microparticles, but, where they are dissimilar in size to the latter, higher concentrations of disperse phase and hence higher solids contents may be attained through the use of bimodal or polymodal size distributions. Like the polymer microparticles, the pigment, filler or extender particles will be stably dispersed in a deflocculated state in the liquid continuous phase. This state of dispersion may be achieved with the aid of known types of pigment dispersant, but in many cases the liquid film-forming material in the continuous phase, or a chemical variant thereof, may itself be an effective dispersant. Alternatively, the pigment may be dispersed in the dispersion of microparticles in inert liquid, where those particles have been obtained by dispersion polymerisation of reactants in that liquid in the manner previously described. In this case, residual amounts of the amphipathic dispersing agent whereby the microparticles are stabilised will serve also to stabilise the pigment particles, and may additionally render them capable of participating in the autoxidative curing reaction. In both the above techniques, the operation of dispersing the pigment may be carried out in the ways which are conventional in the paint industry; i.e. by the use of ball-mills, bead mills, attritors or colloidal mills.

Yet another procedure for introducing pigments is that of carrying out the dispersion polymerisation process, whereby the microparticles are obtained, actually in the presence of the pigment. In this way, each microparticle can be caused to incorporate one or more sub-particles of pigment. Such techniques of polymer encapsulation of pigments are described in British Pat. Specification No. 1,453,713 or in U.S. Pat. No. 4,102,846.

The other essential component of the filmforming material in the compositions of the invention is, as already indicated, the liquid continuous phase which has a boiling point in excess of 150° C. at atmospheric pressure, has a viscosity lying within a specified range, namely from 0.1 to 20 poise at room temperature, and is capable of curing to a polymeric film by a process initiated by autoxidisable groupings as hereinbefore defined. This liquid continuous phase consists of two components: (i) an autoxidisable derivative of a polyhydric alcohol which contains in the molecule from 4 to 12 autoxidisable groupings; (ii) a compound of specified low viscosity containing in the molecule at least one coreactive unsaturated grouping.

Suitable autoxidisable groupings for inclusion in component (i) include residues of autoxidisable fatty acids, such as those derived from linseed oil, soya bean oil, tall oil, dehydrated castor oil, fish oils or tung oil. They also include unsaturated systems such as those derived from pentadiene ($-CH=CH-CH_2-CH=CH-$), hetatriene ($-CH=CH-CH_2-CH=CH.CH_2CH=CH-$) and related conjugated systems; these are usually provided by natural unsaturated $C_{18}$ carboxylic acids. Other suitable groupings are unsaturated ether groupings such as are found in allyl ethers, cyclopentenylethers and vinyl dioxolanes, and residual unsaturation present in polymers or copolymers of butadiene. The foregoing are all materials which are capable of forming either hydroperoxides or peroxides; the latter decompose to give active radicals which can dimerise or initiate addition polymerisation, and therefore create linkages between the participating constituents at the temperature of curing of the film.

Suitable unsaturated coreactive groupings for inclusion in component (ii) are ethylenically unsaturated groupings such as $\alpha,\beta$-unsaturated groupings, allylic unsaturated groups and pentadienyl and heptatrienyl systems, all of which are capable of participating in a polymerisation initiated by radicals generated by an autoxidative mechanism from a constituent of the continuous phase liquid bearing an autoxidisable group.

The component (i) of the liquid continuous phase may be either a simple derivative of a polyhydric alcohol, in the sense that it contains only one polyhydric alcohol residue in the molecule, or it may be an oligomeric or polymeric derivative containing more than one such residue per molecule.

Examples of suitable simple derivatives include in particular the esters of polyhydric alcohols such as pentaerythritol, dipentaerythritol, tripentaerythritol, inositol and sorbitol, with any of the autoxidisable fatty acids mentioned above wherein at least four of the original hydroxyl groups are esterified, e.g. tetra-esters of pentaerythritol with linseed oil fatty acid, tetra-or-hexa-esters of dipentaerythritol with the same acid, and terta-, hexa- or octa-esters of tripentaerythritol with the same acid, or the corresponding esters with soya bean oil fatty acid. Suitable simple ether derivatives which may be mentioned are the polyallyl ethers of diglycerol, triglycerol and tetraglycerol, as well as the oligomeric addition products obtained by reacting allyl glycidyl ether with aliphatic alcohols, glycidol, glycols or polyols provided that such addition products contain at least four allyl groups in the molecule, e.g. the reaction product of decanol with four moles of allyl glycidyl ether.

Examples of oligomeric or polymeric polyhydric alcohol derivatives which are suitable include oil-modified alkyd resins, obtained by reacting the polyhydric alcohol in conventional fashion with a polycarboxylic acid, with the simultaneous introduction of residues of any of the autoxidisable fatty acids mentioned above. The nature and relative proportions of the reactants must, however, be chosen so that the resulting alkyd resin contains from 4 to 12 autoxidisable grouping per molecule, and it is preferred that the number average molecular weight of the resin lies in the range 1000–3000.

Preferably, the component (i) of the liquid continuous phase contains from 6 to 10 autoxidisable groups in the molecule. The component (i) may be a single substance or a mixture of two or more substances satisfying the criteria specified above.

Examples of suitable components (ii) of the liquid continuous phase include in particular the acrylic and methacrylic esters of higher monohydric alcohols containing at least 6 carbon atoms, such as hexyl methacrylate, octyl methacrylate and lauryl methacrylate, and corresponding esters of di- and polyhydric alcohols, such as trimethylolpropane triacrylate, trimethylolpropane trimethacrylate, ethylene glycol diacrylate, ethylene glycol dimethacrylate, 1:6-hexylene diacrylate, 1:6-hexylene dimethacrylate, and the diacrylates or dimethacrylates of tetra- and polyethylene glycols.

Yet other suitable liquids containing coreactive groupings are esters of allyl alcohol with unsaturated acids, such as allyl methacrylate and allyl pentadienoate. Esters of allyl alcohol, cyclopentenyl ethers and 4-hydroxybutyl vinyl dioxolane with mono-, di- or tricarboxylic acids are also suitable; examples of such esters include diallyl muconate, allyl sorbate, allyl hydrogen maleate, diallyl maleate, allyl hydrogen itaconate, diallyl itaconate, allyl crotonate and diallyl phthalate, the trimellitate of hydroxybutyl vinyl dioxolane, 1:3:4-trivinyldioxolane and mixed unsaturated fatty acid/acrylic acid esters of polyols such as glycerol; also suitable are dioxanes and polydioxolanes which are the condensation products of acrolein or related unsaturated aldehydes with polyols such as pentaerythritol or sorbitol containing 1:2- or 1:3-diol groupings.

As with component (i), component (ii) may be a single substance or it may be a mixture of two or more substances satisfying the criteria specified.

In choosing the constituents of the liquid continuous phase, there should be taken into account the degree of swelling which they may induce in the non-crosslinked polymer microparticles. A moderate swelling action can be accommodated, but excessive swelling should be avoided and clearly the choice of constituents should not result in any dissolution of the microparticles in the continuous phase. The specified low viscosity of the component (ii) may be utilised to offset a relatively high viscosity of the component (i), such that the blend of the two components satisfies the viscosity requirement for the continuous phase liquid as a whole. In order that the continuous phase liquid should be a homogeneous mixture, the constituent substances are required to have good mutual solubility or miscibility.

The relative proportions of the two components of the continuous phase may, as will be apparent to those skilled in the art, be varied in order to meet certain desiderata such as a particular viscosity for the continuous phase as a whole (lying within the range hereinabove specified) or particular autoxidative curing characteristics. However, it may be stated for guidance that the co-reactive component (ii) will usually constitute from 5% to 40% by weight of the total continuous phase, more usually from 15% to 30% by weight.

In addition to the film-components already mentioned, that is to say the disperse phase (a) and the liquid continuous phase (b), the compositions of the invention may contain up to 30% by volume, based on the total composition, of an inert liquid diluent which is a solvent for the liquid continuous phase and which volatilises under the conditions of application of the coating composition to a substrate. Expressed in another way, the film-forming content of the compositions may range from 70% to a maximum of 100% by volume.

Suitable inert diluents are liquids of low viscosity, preferably not more than 0.05 poise, which are capable of assisting (or at least do not positively hinder) the achievement of a state of stable dispersion of the disperse phase in the continuous phase. The inert diluent must be of sufficiently high volatility to be readily romoved by evaporation from a coating formed from a composition of the invention, either at room temperature or at an elevated temperature as the process of curing the liquid continuous phase may require.

Examples of particularly suitable inert solvents include aromatic or aliphatic hydrocarbons, but other inert liquids of suitable volatility, lack of toxicity and absence of strong odour may be used, such as selected halogenated hydrocarbons, lower alcohols and water.

In the interests of achieving as high a filmforming solids content as possible in the compositions, it is preferred where possible to omit an inert solvent altogether, but its inclusion may be difficult to avoid entirely by reason of the polymer microparticles themselves being most conveniently accessible in the form of a dispersion in an inert liquid, as mentioned above.

The compositions may also contain metallic or non-metallic drier systems whereby the autoxidative curing process is assisted. These may be, for example, conventional driers of the metallic soap type such as cobalt, calcium, zirconium or lead salts of napththenic acid or octoic acid. These may conveniently be dissolved in the liquid continuous phase after all other constituents of the composition have been incorporated. The driers may be used in amounts which are conventional in air-drying coating compositions, for example, so as to give a cobalt content of up to 0.1%, a lead content of up to 2% and a calcium content of up to 1%, based on the total weight of autoxidisable groups present.

Preferably the film-forming material in the coating compositions of the invention consists of from 40% to 80% by volume of disperse phase and from 60% to 20% by volume of liquid continuous phase as hereinbefore defined. It will be understood, therefore, that when these preferred ranges apply the total amount of polyester microparticles and any pigment, filler or extender particles present will lie within the above range 50% to 80%.

Coating compositions according to the invention may be applied to a substrate by any of the conventional methods, e.g. by brushing, rolling, spreading, spraying, including airless and electrostatic spraying, tumbling, curtain coating and roller coating. They undergo air-drying in a similar fashion to conventional air-drying paints, being touch-dry in from 30 minutes to 8 hours and through-dry in from 2 hours to 48 hours. However, unlike conventional air-drying paints, they typically have very high film-forming solids contents (80–100% by weight including pigment where present, as compared with 70% solids or lower in most known compositions), and in consequence possess distinct advantages in much reduced (or complete absence of) release of volatile materials on drying. In addition, they are superior to high solids coating compositions which have previously been proposed in that a high proportion of the total solids present consists of pre-polymerised, highly functional material (viz. the polymer microparticles), the extent of polymer-forming reactions which are required to take place after application to the substrate being therefore much less than in the composition where the film-forming material consists predominantly of monomeric or oligomeric substances. Their superiority in this respect is manifest in the possibility of building up coatings of a greater thickness in a single application with good scratch filling and without the penalty of surface shrinkage than is possible with known high-solids coating compositions. The presence of the preformed polyester microparticles also imparts a greater constancy and consistency of durability and mechanical properties than is otherwise achieved. A still further advantage of the high microparticle content is the corresponding reduction in the proportion present of residues of natural drying oil fatty acids which tend to give rise to problems of smell, yellowing and premature embrittlement through overoxidation; moreover, a corresponding reduction can be made in the amount of metal soaps or driers, in particular of lead soaps, required to bring about oxidation and curing of the compositions.

For many methods of application, including brushing, it is an advantage if the rheology of the coating composition can be appropriately adjusted. For instance, a measure of thixotropic behaviour may help to prevent sagging of films on application or settling of the composition in the can. It is often found that compositions such as those of the present invention which contain high concentrations of disperse particles, whether of polymer or of pigment, tend rather to have dilatant characteristics. In the compositions illustrated in the Examples which follow, dilatancy is avoided by achieving a distribution of microparticle sizes; under these circumstances, high particle loadings are possible without the penalty of dilatant behaviour. Some degree of thixotropy can be introduced by careful control of the ingredients of the composition, in particular by using as one constituent of the continuous phase hexanediol dimethacrylate. This result may possibly be due to reversible swelling of the polymer microparticles by this coreactive liquid. Thixotropic structure may also be imparted by the use of certain drier systems.

The invention is illustrated but not limited by the following Examples, in which parts and percentages are by weight unless otherwise stated:

EXAMPLE 1

A. Preparation of Polymer Microparticles

A two-liter laboratory reactor fitted with stirrer, emulsifying head, steam-jacketed condenser and Dean and Stark separator and thermometer was charged with the following reactants:

Aliphatic hydrocarbon (boiling range 190°–210° C.): 327 g
Graft copolymer dispersant solution (40%) (as described below): 74 g
Maleic anhydride: 294 g This charge was heated to 170° C. with stirring, and at that temperature the emulsifying head was turned on. One half of the following feed was then added over 15 minutes:

Propylene glycol: 182 g
Diethylene glycol: 106 g

The batch was then allowed to reach reflux temperature (initially 175° C.) and the remaining feed was added over 30 minutes.

Refluxing was continued over a further 5 hours, when 86 mls of water had been removed, the reflux temperature had risen to 192° C. and the acid value of the solid polymer had fallen to 29 mg KOH/g. Diluent was then removed to give a final solids content of 76.5% by weight.

The graft copolymer dispersant used was obtained by reacting poly(12-hydroxystearic acid) with glycidyl methacrylate and copolymerising the product at a ratio of 1:1 by weight with methyl methacrylate.

The final product had the composition PHS/MMA/GMA=48/50/2 by weight, residual glycidyl methacrylate being present due to the use of excess of that material in the initial reaction with the poly(12-hydroxystearic acid). The product was used as a 40% solution in the above-described aliphatic hydrocarbon.

The final composition of the Polymer microparticles dispersion was propylene glycol/diethylene glycol/maleic anhydride=2.4/1/3 molar, the product having a particle size of 0.2–5 microns and the polymer particles having a glass transition temperature of 25° C.

B. Millbase Preparation

The following materials were charged to a 1-gallon laboratory ballmill together with the requisite amount of porcelain balls:

Titanium dioxide RCR6 (ex Tioxide International): 2000 parts
Soya bean oil fatty acid hexa-ester of tripentaerythritol (viscosity 3 poise): 300 parts
Aliphatic hydrocarbon (boiling range 100°–120° C.): 310 parts The mill contents were ground for 24 hours, and the grinding medium then separated. The product had a solids content of 88%.

C. Paint Preparation

The following ingredients were charged to a rotary evaporator, and volatile diluent was removed under vacuum:

Polymer dispersion (from A above): 44.6 parts
Millbase (from B above: 58.2 parts
Linseed oil fatty acid hexa-ester of tripentaerythritol (viscosity 3 poise): 1.2 parts
Decanol/allyl glycidyl ether reaction product (as described below): 13.6 parts Following this, the following was added:
Hexyl methacrylate (viscosity 0.015 poise): 4.7 parts
Drier mixture: 6.1 parts
(consisting of Cobalt Octoate solution (10% Co as metal) 3.4%, Calcium Octoate solution (5% Ca) 68.2%, Lead Octoate solution (36% Pb) 28.4%).

The paint was adjusted by the addition of aliphatic hydrocarbon (boiling range 140°-160° C.) to 3.5 poise viscosity as measured on a high shear cone and plate viscometer; the solids content was then found to be 92% by weight (85.5% by volume). The paint dried to a hard, glossy film when applied to a surface at normal temperature.

The composition of the paint as applied was as follows:

| | | % by Weight | % by Volume |
|---|---|---|---|
| Disperse Phase | Polymer microparticles | 29 | 39 |
| | Pigments | 38 | 13 |
| Continuous Phase | Autoxidisable liquid | 18 | 24 |
| | Coreactive liquid | 4 | 6.5 |
| | Driers | 3 | 3 |
| Inert Diluent | | 8 | 14.5 |

The viscosity of the continuous phase, excluding driers, was 5 poise; that of the continuous phase plus driers and diluent, 0.2 poise.

The decanol/allyl glycidyl ether reaction product used in the above procedure was obtained as follows. Decanol (158 parts) and boron trifluoride etherate (1.6 parts were heated together to 60° C. and allyl glycidyl ether (434 parts) was added dropwise over a period of about 60 minutes, the temperature being kept down to 60° C. with cooling. The resulting condensation product had the molar composition decanol: allyl glycidyl ether=1:4. Its viscosity was 1.5 poise.

EXAMPLE 2

A. Preparation of Polymer Microparticles

The same apparatus as described in Example 1A was charged with:
Aliphatic hydrocarbon (boiling range 190°-210° C.): 342 parts
Graft copolymer dispersant solution (40%) (as described in Example 1): 76 parts
Phthalic anhydride: 296 parts
Maleic anhydride: 49 parts
A feed was added in two portions, as described in Example 1A, consisting of:
Propylene glycol: 182 parts
Polyethylene glycol mol. wt. 200: 100 parts Following the addition of all the feed, refluxing was continued for a further 7 hours, during which time 16 parts of water were removed, the reflux temperature had risen to 195° C. and the acid value of the solid polymer had fallen to 26 mg KOH/g. Diluent was then removed to give a solids content of 73%.

The resulting microparticulate polymer had the composition propylene glycol/polyethylene glycol 200/phthalic anhydride/maleic anhydride 4.8/4/1 molar. The product was of particle size 0.8–4 microns and the polymer particles had a glass transition temperature of 13° C.

B Millbase Preparation

A millbase was made by milling the following ingredients in a laboratory bead mill for 15 minutes:
Microparticle dispersion (from A above): 46.8 parts
Titanium dioxide RCR6 (ex Tioxide International): 37.2 parts
68% soya bean oil/pentaerythritol alkyd resin (70% solution) (viscosity at 100% solids, 450 poise; $\bar{M}_n$, 4400; autoxidisable group functionality, 8): 8.9 parts

C. Paint Preparation

The following ingredients were charged to a rotary evaporator and volatile diluent was removed under vacuum:
Millbase (from B above): 92.9 parts
Linseed oil fatty acid octa-ester of tripentaerythritol (viscosity 2.2 poise): 14.1 parts
The following were then added:
Lauryl methacrylate (viscosity 0.06 poise): 4.7 parts
Drier mixture (as in Example 1C): 6.1 parts The paint was adjusted to 4.5 poise viscosity (as measured on a high shear cone and plate viscometer) by the addition of aliphatic hydrocarbon (boiling range 140°-160° C.). The solids content was then found to be 89% by weight (82.4% by volume). When applied under normal conditions, the paint dried to a hard, glossy film.

The composition of the paint as applied was as follows:

| | | % by Weight | % by Volume |
|---|---|---|---|
| Disperse Phase | Polymer microparticles | 30.4 | 38.8 |
| | Pigments | 33.1 | 10.1 |
| | Alkyd resin | 5.9 | 8.4 |
| Continuous Phase | Autoxidisable liquid (other than alkyd) | 12.1 | 17.2 |
| | Coreactive liquid | 4.2 | 5.4 |
| | Driers | 3.3 | 2.5 |
| Inert Diluent | | 11.0 | 17.6 |

The viscosity of the continuous phase, excluding driers, was 5 poise; that of the continuous phase plus driers and diluent, 0.2 poise.

EXAMPLE 3

A. Preparation of Polymer Microparticles

The same apparatus as described in Example 1A was charged with the following:
Aliphatic hydrocarbon (boiling range 190°-210° C.): 229 parts
Graft copolymer dispersant solution (40%) (as described in Example 1): 85 parts
Maleic anhydride: 294 parts
A feed was added in two portions, as described in Example 1, consisting of:
Propylene glycol: 73 parts
Diethylene glycol: 280 parts Following the addition of all the glycols, refluxing was continued for an additional 4 hours, during which time a total of 44 parts of water was removed. The final reflux temperature was 187° C. and the acid value of the solid polymer had then fallen to 24 mg KOH/g. Diluent was removed to give a final microparticle dispersion of solids content 77%.

The microparticulate polymer composition was: propylene glycol/diethylene glycol/maleic anhydride 0.96/2.64/3.0 molar. The polymer particles were within the size range 0.5–2 microns and had a glass transition temperature of 18° C.

B. Millbase Preparation

The same millbase was used as is described above in Example 1B.

C. Paint Preparation

The following ingredients were mixed with stirring:
Polymer microparticle dispersion (from A above): 44.3 parts
Millbase (as described in Example 1B): 58.2 parts
Linseed oil fatty acid hexa-ester of tripentaerythritol (viscosity 3 poise): 1.2 parts
Linseed oil fatty acid octa-ester of tripentaerythritol (viscosity 2.2 poise): 14.1 parts
Ethylene glycol dimethacrylate (viscosity 0.04 poise): 4.7 parts
Driers mixture (as described in Example 1C): 6.1 parts The product was a fluid paint of 2.6 poise viscosity and solids content 84.5% by weight (73.3% by volume). On application at normal temperature, the paint dried to a hard glossy film.

The composition of the paint as at application was as follows:

|  |  | % by Weight | % by Volume |
|---|---|---|---|
| Disperse Phase | Polymer microparticles | 26.6 | 33.4 |
|  | Pigment (TiO$_2$) | 34.8 | 11.0 |
| Continuous Phase | Autoxidisable liquid | 16.5 | 20.7 |
|  | Coreactive liquid | 3.6 | 5.6 |
|  | Driers | 2.9 | 2.6 |
| Inert Diluent |  | 15.6 | 26.7 |

The viscosity of the continuous phase, excluding driers was 4 poise; that of the continuous phase plus driers and diluent, 0.1 poise.

EXAMPLE 4

A. Preparation of Polymer Microparticles (a) Preparation of Amphipathic Copolymer Dispersant (i) A mixture of technical ricinoleic acid (2770 parts), toluene (455 parts) and methanesulphonic acid (5 parts) was heated under reflux at 180°–190° C., water of condensation being removed (190 parts) until the reaction mixture was found to have an acid value of 32.4 mg KOH/g (reaction time was about 6 hours). The solution of poly(ricinoleic acid) thus obtained had a solids content of 84.3%. $\overline{M}_n$ determined by end-group analysis was 1731 and by gel permeation chromatography 2400; $\overline{M}_w$ was 5150, hence $\overline{M}_1/\overline{M}_n = 2.14$.

(ii) A mixture of methyl ethyl ketone (1600 parts) and toluene (1600 parts) was heated to reflux temperature and to it was fed, over a period of 2 hours with continuous reflux, a mixture of methyl methacrylate (1920 parts), glycidyl methacrylate (195 parts), azobis-(isobutyronitrile) (29 parts) and primary-octyl mercaptan (29 parts). The reaction mixture was held at reflux temperature for a further 4 hours. 2-Ethoxyethyl acetate (1778 parts) was then added and the mixture distilled until a total of 3200 parts of distillate was removed. The product was a 55% solids solution of copolymer having $\overline{M}_w/\overline{M}_n = 3.83$).

(iii) The copolymer solution obtained in (ii) (2685 parts) along with 1655 parts of 2-ethoxyethyl acetate was heated to reflux temperature and a mixture of the solution of poly(ricinoleic acid) obtained in (i) (750 parts) and dimethyllauryl-amine (2.5 parts) was added. Heating under reflux was continued for 14 hours; a further mixture of the poly(ricinoleic acid) solution (750 parts) and dimethyllaurylamine (2.5 parts) was then added and refluxing continued for 36 hours, a small further amount of dimethyllaurylamine being added after 12 hours. The reaction mixture became progressively clearer over the total heating period and continuous monitoring of its acid value showed that the latter fell to a final value of less than 1 mg KOH/g. Hydrocarbon of boiling range 180°–210° C. ("Isopar L") (3500 parts) was added, and the mixture distilled until about 2500 parts of distillate had been removed. The product was a 40% solids solution of a graft copolymer dispersant having an acrylic polymer backbone and pendant side-chains of poly(ricinoleic acid) residues. It had $\overline{M}_n = 7000$ and $\overline{M}_w = 23,400$ ($\overline{M}_w/\overline{M}_n = 3.37$) as determined by gel permeation chromatography with polystyrene calibration.

(b) Preparation of Polyester Microparticle Dispersion

To a 6-liter flask fitted with turbine stirrer, steam-heated condenser and Dean and Stark separator there was charged the following:
Isophthalic acid: 438 g
Trimethylolpropane: 283 g
Neopentyl glycol: 439 g
Ethylene glycol titanate: 4.2 g
Xylene: As required to achieve reflux of mixture The charge was heated to reflux temperature (196° C.) and 50 g of water of reaction was removed, giving a clear melt of the isophthalic acid partial esters. After cooling to 140° C., there was added 478 g of adipic acid and the temperature was then raised to 160° C. with stirring. The stirrer was stopped and the following ingredients, preheated to 150° C. were added:
40% solution of copolymer from A above: 226 g
Aliphatic hydrocarbon (boiling range 190°–210° C.): 942 g The stirrer was re-started at high speed in order to emulsify the mixture effectively, and the temperature was raised to reflux at 180°–190° C. Over a period of 3 hours, during which 250 g of water of reaction was removed, there was added at a steady rate the following mixture:
40% solution of copolymer dispersant from A above: 100 g
Aliphatic hydrocarbon (boiling range 190°–210° C.): 100 g Thereafter diluent was removed by distillation until the residue had a solids content of 76%. The product was a fluid dispersion of polyester particles of size 0.5–5 microns, in which the molar ratios of isophthalic acid: adipic acid: trimethylolpropane: neopentyl glycol were 0.4:0.6:0.32:0.64. The particles dissolved completely when the dispersion was diluted with acetone, and therefore the particles were not crosslinked. The polymer was found to have a glass-rubber transition temperature of −12° C. and an acid value of 37 mg KOH/g.

B. Unpigmented Coating Preparation

The following components were mixed with stirring to give an unpigmented coating composition:
Polymer microparticle dispersion (from A above): 44.6 parts
Linseed oil fatty acid octa-ester of tripentaerythritol (viscosity 2.2 poise): 14.8 parts
1:6-Hexane diol dimethacrylate (viscosity 0.37 poise): 4.7 parts
Drier mixture as in Example 1: 6.1 parts The mixture had 2 poise viscosity and 81% solids content by weight (77% by volume), and when applied by brush, though it was initially white and opaque, it became touch dry in 8 hours and hard dry in 16 hours, giving a substantially clear, tough and elastic coating.

The composition of the paint as applied was as follows:

|  |  | % by Weight | % by Volume |
|---|---|---|---|
| Disperse phase | Polymer microparticles | 49 | 47 |
| Continuous phase | Autoxidisable liquid | 21 | 21 |
|  | Coreactive liquid | 7 | 7 |
|  | Driers | 4 | 2 |
| Inert Diluent |  | 19 | 23 |

The viscosity of the continuous phase, excluding driers was 8 poise; the of the continuous phase plus driers plus diluent, was 0.35 poise.

Comparative Example A

The procedure described in section A of Example 4 was repeated, with the exception that the final removal of diluent by distillation was continued until the dispersion of polyester microparticles obtained had a solids content of 86%.

From this dispersion, an unpigmented coating composition was prepared, by blending the following ingredients with stirring:

Polyester microparticle dispersion, 86% solids: 3.94 parts
Linseed oil (alkali-refined varnish grade): 1.48 parts
Hexanediol dimethacrylate: 0.47 part
Drier mixture (as described in Example 1): 0.61 part
Inert diluent (aliphatic hydrocarbon, boiling range 150°–190° C.): 0.30 part The resulting composition had a viscosity of 2 poise at 25° C. and a total solids content of 83.2% by weight, that is to say, it had similar characteristics in these respects to the composition described in Example 4 (B). Its compositional analysis was as follows:

|  |  | % by weight |
|---|---|---|
| Disperse phase | Polymer microparticles | 50.0 |
| Continuous phase | Autoxidisable liquid | 21.8 |
|  | Coreactive liquid | 6.9 |
|  | Driers | 4.5 |
| Inert diluent |  | 16.8 |

The composition was spread upon a panel and allowed to dry in air at room temperature. It became touch-dry in 8 hours, but (in contrast to the composition of Example 4) after 20 hours the film was found still to be soft and cheesy in consistency. After 1 week, the film was firmer to the touch, but crumbled when rubbed or scraped.

EXAMPLE 5

A. Preparation of Polymer Microparticles

A 6-liter laboratory reactor fitted with turbine stirrer, steam-jacketed condenser, Dean and Stark separator and thermometer was charged with the following reactants:

Aliphatic hydrocarbon (boiling range 190°–210° C.): 942 g
Graft copolymer dispersant solution (40%) (as described below): 400 g
Phthalic anhydride: 1132 g
Titanium ethylene glycol complex: 1.1 g The charge was heated to 145° C. with stirring, and at that temperature there was added over a period of 5 minutes 87 g of allyl glycidyl ether. Heating was continued up to a temperature of 175° C. and then 654 g of 1:4-butanediol was added over 1 hour at a steady rate. Heating was continued for 4 hours, during which time a further 75 g of dispersant solution were added at a steady rate and the temperature rose to 192° C. Over the total reaction time 140 g of water of reaction was removed, the final acid value of the product being 35 mg KOH/g. Hydrocarbon diluent was removed, to give a final dispersion of 78% solids content and particle size 0.5–2 micron. The polymer had a glass-rubber transition temperature of 27° C.

The graft copolymer dispersant used in this Example was obtained by reacting poly(12-hydroxystearic acid) with glycidyl methacrylate and copolymerising the product at a ratio of 2:1 by weight with a 90/10 mixture of methyl methacrylate and methacrylic acid. The product was used as a 40% solution in the above-described aliphatic hydrocarbon.

B. Millbase Preparation

To a 1-gallon ballmill were charged titanium dioxide (760 g), the polyester microparticle dispersion described in A above (930 g) and the linseed oil fatty acid hexa-ester of tripentaerythritol (viscosity 3 poise) (140 g), together with the requisite quantity of ⅜" steatite balls. The contents of the mill were ground for 16 hours. The product was an 88.6% solids dispersion, the solids present consisting of 47% titanium dioxide, 44.6% of the microparticulate polymer and 8.5% of the hexa-ester.

C. Preparation of Paint Composition

The following ingredients were mixed with stirring:
Polymer millbase (as in B above): 1260 parts
Soya bean oil fatty acid octa-ester of tripentaerythritol (viscosity 3 poise): 194 parts
Lauryl methacrylate (viscosity 0.06 poise): 65 parts
Drier mixture as in Example 1: 84 parts The paint obtained has a solids content of 89% by weight (82.3% by volume) and a viscosity of 4.5 poise. The paint was applied by brush and after standing overnight was found to be touch-dry and substantially hard-dry.

The paint as applied had the following composition:

|  |  | % by Weight | % by Volume |
|---|---|---|---|
| Disperse phase | Polymer microparticles | 31 | 39.8 |
|  | Pigment | 34 | 10.4 |
| Continuous phase | Autoxidisable liquid | 18 | 25.7 |
|  | Coreactive liquid | 4 | 5.1 |
|  | Driers | 2 | 1.3 |
| Inert Diluent |  | 11 | 17.7 |

The viscosity of the continuous phase, excluding driers, was 4 poise; that of the continuous phase plus driers and diluent was 0.25 poise.

EXAMPLE 6

A. Preparation of Polymer Microparticles (a) Preparation of Amphipathic Copolymer Dispersant (i) A mixture of technical 12-hydroxystearic acid (1500 parts), tall oil fatty acids (117 parts), toluene (230 parts) and methane sulphonic acid (3 parts) was heated under reflux at around 160° C. for 8 hours, during which time 68 parts of water of condensation were removed. The final product had an acid value of 45 mg KOH/g and was a 86.9% solids solution. The polymeric product, being derived from technical 12-hydroxystearic acid containing 9.5% stearic acid, had a final composition stearic acid/tall oil fatty acid/12-hydroxystearic acid 0.5/0.42/4.53 molar, and hence approximately half of the polymer chains produced were terminated by an ester of tall oil fatty acid. The molecular weight of the polymer determined by acid value was $\overline{M}_n = 1250$, and determined by gel permeation chromatograph (polystyrene calibration) was $\overline{M}_n = 1650$, $\overline{M}_w = 3700$.

(ii) A copolymer was prepared, by a drip feed process using azobis (isobutyronitrile) as initiator, of methyl methacrylate and glycidyl methacrylate in the proportions 83/17 by weight. The product was a 40% solids solution of the copolymer and by G.P.C. the copolymer was found to have $\overline{M}_n = 8400$, $\overline{M}_w = 17,000$.

(iii) The amphipathic copolymer dispersant was prepared by reacting 333 parts of the polymer solution from (ii) above with 230 parts of the polymer solution from (i) above, along with 370 parts of 2-ethoxyethyl acetate and 0.5 part of dimethyllaurylamine. The batch was raised to reflux temperature and distillate was removed to bring the reflux temperature up to 180° C. After refluxing over a period of 2 days, the acid value had dropped to below 0.5 mg KOH/g. Aliphatic hydrocarbon (boiling range 180°–210° C.) was then added and diluent was removed by distillation to give a final dispersant copolymer solution of 32% solids in the hydrocarbon. The graft copolymer thus obtained had an acrylic polymer backbone containing about 2% of pendant glycidyl groups, and pendant side-chains of poly(12-hydroxystearic) acid about half of which were terminated with tall oil fatty acid and half with stearic acid.

(b) Preparation of Dispersion

A 4-liter reaction vessel, fitted as described in Example 1 and in addition carrying an emulsifying head running submerged in the reactants, was used. To this vessel was charged:

Aliphatic hydrocarbon (boiling range 180°–210° C): 858 parts
Phthalic anhydride: 440 parts
Dispersant solution (as obtained in (a) above): 378 parts
Titanium/tin-ethylene glycol complex: 0.5 part This charge was raised to reflux temperature and to it was added the following feed mixture, half of the mixture being added over 10 minutes and the remaining half over a further 2 hours:

Polyethylene glycol mol. wt. 200: 302 parts
Diethylene glycol: 172 parts

The batch was held at reflux temperature over a total period of 10 hours, during which time 53 g of water was removed. The product, following the removal of some diluent by distillation, had a solids content of 78.5% and consisted of particles of size 0.5–3 microns. The molar formula of the polymer was phthalic anhydride/polyethylene glycol 200/diethylene glycol 1:0.50:0.55. The final acid value was 15 mg KOH/g; the particles were soluble in acetone and hence were not crosslinked. Their glass-rubber transition temperature was +1° C.

B. Preparation of Alkyd Resin

An alkyd resin was prepared by the following procedure. To a reaction vessel fitted with stirrer, reflux condenser with Dean and Stark separator, thermometer and nitrogen feed, were charged:

Tall oil fatty acids: 1493 parts
Pentaerythritol: 391 parts
Phthalic anhydride: 395 parts These ingredients were heated to 200° C. and sufficient xylene was added to maintain reflux at this temperature. Condensation was allowed to proceed until the acid value of the product had fallen to 13 mg KOH/g (non-vol.). The product was thinned to a solids content of 79% with white spirit, the viscosity then being 7 poise. The molecular weights of the resin, determined by G.P.C., were: $\overline{M}_n$, 2600; $\overline{M}_w$ 5,700. The autoxidisable group functionality of the resin was 6.5. The molar ratios of the reactants used were TOFA/PE/PA = 2.0/1.08/1.0.

C. Preparation of Paint

A paint was made up by blending the following ingredients:

Alkyd resin, as described in (B) above: 19.4 parts
Polymer microparticle dispersion, as described in (A) above: 43.4 parts
Millbase, as described in Example 3: 58.2 parts This blend was charged to a rotary evaporator, when 5.3 parts of diluent were removed. The following were then blended in:

Ethylene glycol dimethacrylate: 4.7 parts
Drier mixture (as described in Example 1): 6.1 parts The paint thus obtained had a viscosity of 2.5 poise and a solids content of 85.7% by weight (76.9% by volume).

When spread on a glass panel and allowed to dry, it was found that touch-dry condition was reached in 3 hours. After drying overnight, the film was hard dry and resistant to 5 acetone rubs, indicating that crosslinking had occurred.

The composition of the paint as applied was as follows:

|  |  | % by Weight | % by Volume |
|---|---|---|---|
| Disperse Phase | Polymer microparticles | 26.95 | 10.82 |
|  | Pigment (TiO$_2$) | 35.25 | 34.81 |
| Continuous Phase | Autoxidisable liquid | 17.40 | 24.97 |
|  | Coreactive liquid | 3.70 | 4.80 |
|  | Driers | 2.40 | 1.53 |
| Inert diluent |  | 14.30 | 23.07 |

COMPARATIVE EXAMPLE B

A. Preparation of Alkyd Resin

An alkyd resin was prepared in accordance with the formulation given in Example VII of British Pat. No. 992,637, that is to say:

Dehydrated castor oil: 484 parts
Glycerol: 50 parts
Pentaerythritol: 55 parts

Phthalic anhydride: 180 parts

In the absence of full details of the processing technique employed in that Example, the repeat preparation was carried out using the normal alkyd resin procedure, viz. employing an initial "monoglyceride" stage at 240° C. for 30 minutes followed by a "bodying" stage at 220° C. using xylene as water-entraining solvent. The final acid value was 4.1 mg KOH/g (non-vol.), and the product was diluted with white spirit to a solids content of 75.75% by weight, at which the viscosity was 180 poise. The molecular weight of the resin, as determined by G.P.C., was: $\overline{M}_n$, 8200; $\overline{M}_w$ 49200. The autoxidative group functionality of the resin was 17.6.

B. Preparation of Paint

The following ingredients were blended:
Alkyd resin solution, as described in (A) above: 20.2 parts
Polymer microparticle dispersion, as described in Example 6: 43.4 parts
Millbase, as described in Example 3: 58.2 parts
Ethylene glycol dimethacrylate: 4.7 parts
Drier mixture, as described in Example 1: 6.1 parts In order to bring the viscosity of this blend down to a level acceptable for application, it was found necessary, because of the inherently high viscosity of the alkyd resin, to add a further 6.2 parts of white spirit. The final solids content of the paint was then 78.1% by weight (66.5% by volume).

When applied to a panel and allowed to air-dry, the paint gave a touch-dry film in 2 hours and a hard-dry film in 8 hours.

The composition of the paint as applied was as follows:

|  |  | % by Weight | % by Volume |
|---|---|---|---|
| Disperse phase | Polymer microparticles | 24.55 | 30.09 |
|  | Pigment (TiO₂) | 32.13 | 9.36 |
| Continuous phase | Autoxidisable liquid | 15.85 | 21.58 |
|  | Coreactive liquid | 3.39 | 4.15 |
|  | Driers | 2.20 | 1.32 |
| Inert diluent |  | 21.88 | 33.50 |

COMPARATIVE EXAMPLE C

A paint was made by blending the following ingredients:
Soya bean-oil fatty acid octa-ester of tripentaerythritol: 20.0 parts
Polymer microparticle dispersion, as described in Example 6: 43.4 parts
Millbase, as described in Example 3: 58.2 parts
Drier mixture, as described in Example 1: 6.1 parts The blend was stripped in a rotary evaporator to remove 4.7 parts of diluent. The resulting paint had a viscosity of 2.6 poise at a solids content of 88.2% by weight (80.65% by volume).

When applied to a panel and allowed to air-dry, the paint was found to give a film which was touch-dry after 5 hours; it was hard enough to be handleable after 24 hours, but when scraped the film proved to be of a cheesy consistency. When submitted to the acetone rub test, the film was removed by only 2 rubs, indicating that it was poorly crosslinked.

The composition of the paint as applied was as follows:

|  |  | % by Weight | % by Volume |
|---|---|---|---|
| Disperse phase | Polymer microparticles | 27.71 | 36.23 |
|  | Pigment (TiO₂) | 36.26 | 11.28 |
| Continuous phase | Autoxidisable liquid | 21.71 | 31.54 |
|  | Driers | 2.48 | 1.60 |
| Inert diluent |  | 11.83 | 19.35 |

We claim:

1. A coating composition in which the film-forming material consists of:
   (a) from 30% to 85% by volume of a disperse phase consisting of particles having a size or size distribution in the range 0.01 to 20 microns, not less than 50% by volume of those particles consisting of non-crosslinked polyester microparticles, and the disperse phase being in a state of stable dispersion maintained by means of an amphipathic dispersing agent in a substantially deflocculated, sterically stabilized state of dispersion in
   (b) from 70% to 15% by volume of a liquid continuous phase in which said polyester is insoluble, the continuous phase having a viscosity of from 0.1 to 20 poise at room temperature, being capable of curing to a film-forming polymer by an autoxidative polymerisation reaction and consisting of a homogeneous mixture of:
      (i) an autoxidisable derivative of a polyhydric alcohol such that in each molecule of the derivative there are present from 4 to 12 autoxidisable groupings bound by ester or ether linkages to a polyhydric alcohol residue, the said derivative having a boiling point in excess of 150° C., and
      (ii) a liquid compound of viscosity less than 2 poise at room temperature which contains in the molecule at least one unsaturated grouping correactive with the autoxidisable groupings in (i) but which is not itself capable of undergoing autoxidative polymerisation, the said compound having a boiling point in excess of 150° C.; the total volume of (a) and (b) being 100% and the autoxidisable groupings constituting at least 30% of the total number of autoxidisable and coreactive groupings in the continuous phase.

2. A composition as claimed in claim 1, wherein the amphipathic dispersing agent whereby the polymer microparticles are brought into a state of stable dispersion in the liquid continuous phase is a graft copolymer comprising as one type of polymeric component a polymer backbone which is not solvatable by the continuous phase liquid and is capable of becoming anchored to the polymer microparticles and as another type of polymeric component a plurality of polymer chains pendant from the backbone which are solvatable by the continuous phase liquid.

3. A composition as claimed in claim 1, wherein the amphipathic dispersing agent contains in the molecule autoxidisable groupings.

4. A composition as claimed in claim 2, wherein the polymer backbone of the graft copolymer dispersing agent contains groupings which are capable of becoming chemically linked to the polymer of which the microparticles consist.

5. A composition as claimed in claim 1, wherein the stable dispersion of the non-crosslinked polyester microparticles is obtained by dispersion polymerisation of suitable reactants, in the presence of the amphipathic dispersing agent, in a volatile, inert organic liquid in which the microparticles are insoluble.

6. A composition as claimed in claim 1, wherein the component (i) of the liquid continuous phase contains in the molecule from 6 to 10 autoxidisable groups in the molecule.

7. A composition as claimed in claim 1, wherein the component (i) of the liquid continuous phase comprises an ester of a drying oil fatty acid with pentaerythritol, dipentaerythritol or tripentaerythritol.

8. A composition as claimed in claim 1, wherein the component (i) of the liquid continuous phase comprises an oil-modified alkyd resin containing from 4 to 12 autoxidisable groupings per molecule and having a number average molecular weight in the range 1000–3000.

9. A composition as claimed in claim 1, wherein the component (i) of the liquid continuous phase comprises the reaction product of decanol with four moles of allyl glycidyl ether.

10. A composition as claimed in claim 1, wherein the component (ii) is selected from the acrylic and methacrylic esters of higher monohydric alcohols containing at least 6 carbon atoms or of di- or polyhydric alcohols.

11. A composition as claimed in claim 1, consisting of from 40% to 80% by volume of disperse phase and from 60% to 20% by volume of liquid continuous phase.

12. A composition as claimed in claim 1 containing, in addition to the disperse phase and continuous phase as therein defined, up to 30% by volume, based on the total composition, of an inert liquid diluent which is a solvent for the liquid continuous phase and which volatilises under the conditions of application of the coating composition to a substrate.

* * * * *